United States Patent
Lewis et al.

(10) Patent No.: US 9,493,054 B2
(45) Date of Patent: Nov. 15, 2016

(54) VEHICLE HVAC CONTROL SYSTEM

(75) Inventors: Joseph Lewis, Lake Orion, MI (US);
Andrew Bayley, Westland, MI (US);
Scott Rogers, Brighton, MI (US);
James Wagner, Novi, MI (US)

(73) Assignee: MAHLE International GmbH, Stuttgart (DE)

( * ) Notice: Subject to any disclaimer, the term of this patent is extended or adjusted under 35 U.S.C. 154(b) by 1151 days.

(21) Appl. No.: 11/945,715

(22) Filed: Nov. 27, 2007

(65) Prior Publication Data

US 2008/0134715 A1 Jun. 12, 2008

Related U.S. Application Data

(60) Provisional application No. 60/861,442, filed on Nov. 29, 2006.

(51) Int. Cl.
*B60H 1/32* (2006.01)
*B60H 1/22* (2006.01)

(52) U.S. Cl.
CPC .......... *B60H 1/3225* (2013.01); *B60H 1/2209* (2013.01); *B60H 1/2221* (2013.01); *B60H 1/3208* (2013.01); *B60H 2001/3248* (2013.01); *B60H 2001/3261* (2013.01)

(58) Field of Classification Search
CPC ............... B60H 1/3225; B60H 1/2209; B60H 1/2221; B60H 1/3208; B60H 2001/3248; B60H 2001/3261
USPC ............................ 62/236, 239, 244; 700/3–4
See application file for complete search history.

(56) References Cited

U.S. PATENT DOCUMENTS

| | | | | |
|---|---|---|---|---|
| 4,947,657 A | * | 8/1990 | Kalmbach | 62/236 |
| 4,949,779 A | | 8/1990 | Kenny et al. | |
| 5,555,737 A | * | 9/1996 | Takeo et al. | 62/230 |
| 6,059,016 A | * | 5/2000 | Rafalovich et al. | 165/41 |
| 6,644,054 B1 | * | 11/2003 | Kettner et al. | 62/228.3 |
| 6,932,148 B1 | * | 8/2005 | Brummett et al. | 165/43 |
| 2001/0027660 A1 | * | 10/2001 | Moffa | 62/239 |
| 2003/0079484 A1 | * | 5/2003 | Matsuoka | 62/180 |
| 2004/0035112 A1 | * | 2/2004 | Bhabra | 60/698 |
| 2004/0039456 A1 | * | 2/2004 | Davlin et al. | 700/3 |
| 2004/0154324 A1 | * | 8/2004 | Hashimoto | 62/228.1 |
| 2004/0250560 A1 | * | 12/2004 | Ikura et al. | 62/236 |
| 2005/0109499 A1 | * | 5/2005 | Iwanami et al. | 165/202 |
| 2005/0198984 A1 | * | 9/2005 | Allen et al. | 62/239 |
| 2005/0210903 A1 | * | 9/2005 | Allen | 62/244 |

FOREIGN PATENT DOCUMENTS

| | | |
|---|---|---|
| DE | 197 04 844 A1 | 8/1998 |
| DE | 198 54 060 A1 | 6/2000 |
| DE | 100 13 463 A1 | 9/2001 |
| DE | 102 20 616 A1 | 11/2003 |

* cited by examiner

*Primary Examiner* — Cassey D Bauer
(74) *Attorney, Agent, or Firm* — Muncy, Geissler, Olds & Lowe, P.C.

(57) ABSTRACT

An auxiliary climate control system for a vehicle comprises a compressor, a condenser in fluid communication with the compressor, and an evaporator in fluid communication with the compressor and the condenser. The system further comprises an auxiliary controller configured to evaluate one or more system parameters to detect a malfunction. The controller is integrated with the main HVAC system and may control one or more elements of the main system.

9 Claims, 16 Drawing Sheets

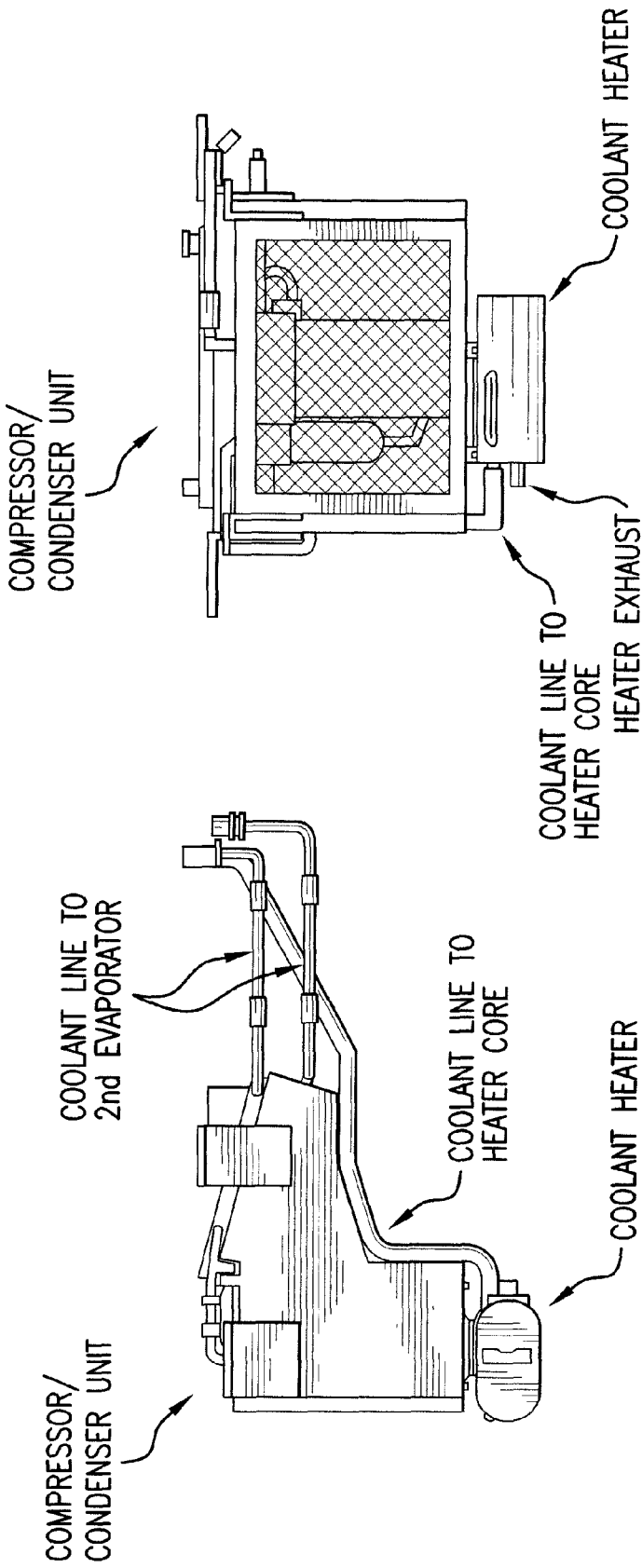

*PARKED OPERATION*

SWITCH/BUTTON HANDLER – 1

STATE OPERATIONS:
*(OPERATIONS IN BACK ARE EXECUTED INDEPENDANTLY OF EACH OTHER)*

INSTRUCTIONS TO BE PERFORMED:

IGNITION SWITCHED ON →

IGNITION ON
1.1

A) SET POWER MODE TO: IGNITION ON
B) CLEAR PARKED HEATING REQUEST
C) CLEAR PARKED COOLING REQUEST
D) CLEAR ENGINE WARM UP REQUEST
E) SHUT OFF HOT, COLD AND WARM UP LED's
F) UPDATE DISPLAY WITH CURRENT SETTINGS

IGNITION SWITCHED OFF AND ALL PARKED OPERATION REQUESTS OFF
(HEATING, COOLING, WARM UP)

ALL SYSTEMS OFF
1.2

A) SET POWER MODE TO: ALL SYSTEMS OFF

IGNITION SWITCHED OFF AND ONE PARKED OPERATION REQUESTS ON
(HEATING, COOLING, WARM UP)

PARKED OPERATION
1.3

A) SET POWER MODE TO: PARKED OPERATION
B) UPDATE LED WITH REQUESTED OPERATION MODE

PARKED HEATING BUTTON PRESSED →

PARKED HEATING REQUEST
1.4

A) SET POWER MODE TO: PARKED OPERATION
B) ALWAYS CLEAR COOLING REQUEST
C) SET HEATING REQUEST IF NOT CURRENTLY ACTIVE
D) CLEAR HEATING REQUEST IF ALREADY ACTIVE
E) TURN HOT LED ON/OFF BASED ON REQUEST STATUS

PARKED COOLING BUTTON PRESSED →

PARKED COOLING REQUEST
1.5

A) SET POWER MODE TO: PARKED OPERATION
B) ALWAYS CLEAR HEATING REQUEST
C) SET COOLING REQUEST IF NOT CURRENTLY ACTIVE
D) CLEAR HEATING REQUEST IF ALREADY ACTIVE
E) TURN COLD LED ON/OFF BASED ON REQUEST STATUS

ENGINE WARM UP SWITCH PRESSED →

ENGINE WARM UP REQUEST
1.6

A) SET WARM UP REQUEST IF NOT CURRENTLY ACTIVE
B) CLEAR WARM UP REQUEST IF ALREADY ACTIVE
C) TURN WARM UP LED ON/OFF BASED ON REQUEST STATUS

FIG.12

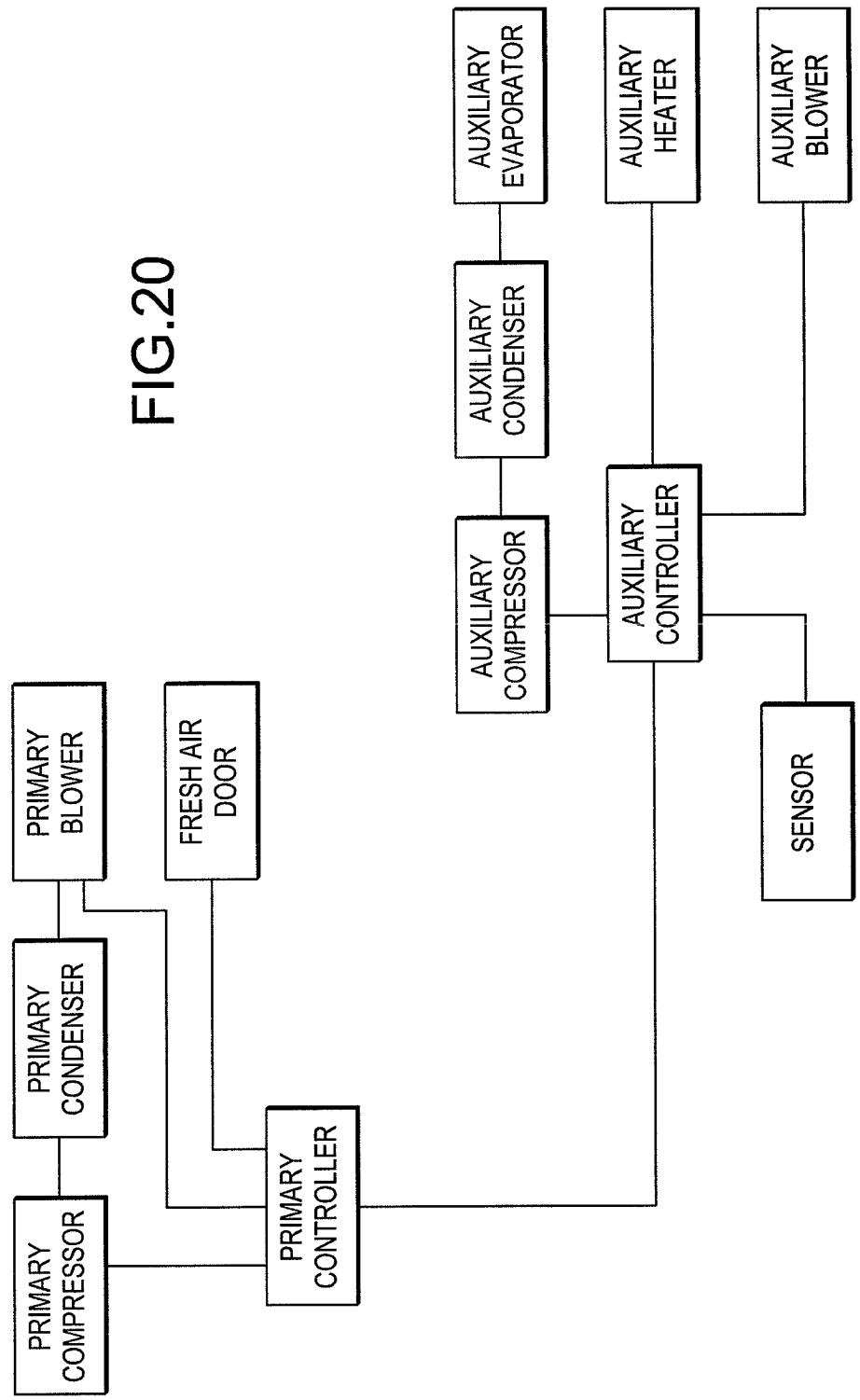

VEHICLE HVAC CONTROL SYSTEM

BACKGROUND

This application claims the benefit of priority to U.S. Provisional Application Ser. No. 60/861,442, filed Nov. 29, 2006, which is incorporated herein by reference in its entirety.

This application relates generally to climate control (heating, ventilating and air-conditioning, or HVAC) systems. More particularly, this application relates to HVAC systems used for motor vehicles.

Primary HVAC systems are often included for climate control of motor vehicles. These systems heat and/or cool air circulated in the occupant cabin of the vehicle. Some of these systems require energy from the vehicle engine such that the vehicle engine must be running (i.e. idling) for the HVAC system to be fully functional when the vehicle is parked. This is particularly an issue with vehicles that are commonly occupied while parked, such as recreational vehicles (RVs), busses, commercial trucks with sleeper cabs, and other such vehicles. However, idling a vehicle engine for a period of time to operate the HVAC system consumes relatively large quantities of fuel and generates exhaust.

To avoid unnecessary fuel consumption and limit the generation of exhaust while still providing a comfortable cabin temperature, auxiliary HVAC units that are independent of the vehicle engine have been used. These systems are generally free standing from the primary HVAC system of the vehicle. Such systems may require control systems to regulate the energy consumption of the auxiliary HVAC system or control the comfort level of the cab.

Accordingly, there is a need for a control system for effectively regulating both the comfort level of the cabin and the energy consumption of the auxiliary HVAC system. There is also a need for an integrated HVAC system that may be controlled by a single user interface.

SUMMARY

One embodiment relates to an auxiliary climate control system for a vehicle comprising a compressor, a condenser in fluid communication with the compressor, an evaporator in fluid communication with the compressor and the condenser. The system further comprises an auxiliary controller configured to measure one or more system parameters. The auxiliary control is configured to evaluate the measured parameter to detect a malfunction.

Other embodiments relate to an auxiliary climate control system for a vehicle comprising a compressor, a condenser in fluid communication with the compressor, and an evaporator in fluid communication with the compressor and the condenser. The system also includes an auxiliary controller configured to communicate with a primary climate control system. A fresh air door of the primary climate control system may be opened or closed based on a signal from the auxiliary controller.

In yet other embodiments, an auxiliary climate control system for a vehicle comprises a compressor, a condenser in fluid communication with the compressor, an evaporator in fluid communication with the compressor and the condenser and an auxiliary coolant heater contained in an auxiliary coolant loop. The auxiliary coolant loop can selectively communicate with the vehicle engine coolant loop, e.g., through a plurality of controllable valves, such that hot coolant may be routed from the auxiliary climate control system through the engine to warm up the engine, e.g., prior to starting the engine.

Further objects, features and advantages of the invention will become apparent from the detailed description of preferred embodiments that follows, when considered with the accompanying figures of drawing.

BRIEF DESCRIPTION OF THE DRAWINGS

FIG. 4 is a side elevation view of a portion of the HVAC system of FIG. 1.

FIG. 5 is a front elevation view of a portion of the HVAC system of FIG. 1.

FIG. 12 is a block diagram for an HVAC control system according to one embodiment of the invention.

FIG. 20 is a schematic illustration of a system according to an embodiment of the present invention.

DETAILED DESCRIPTION OF PREFERRED EMBODIMENTS

Figure 1:
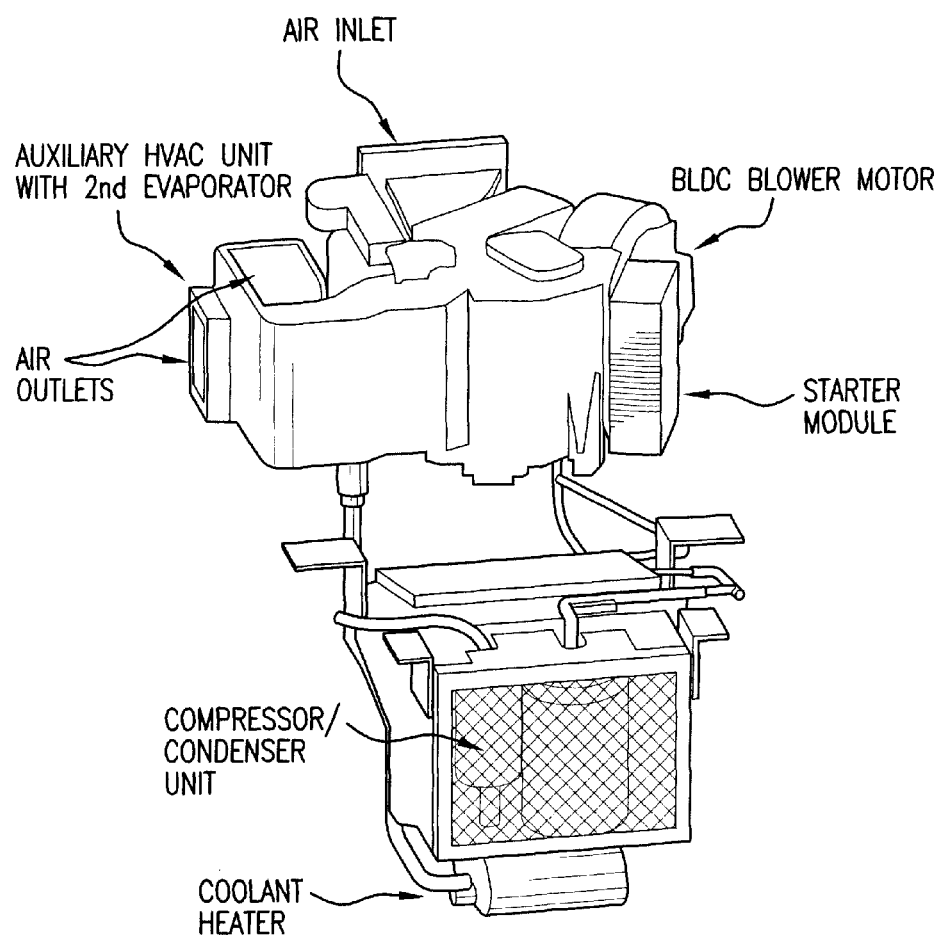
FIG. 1 is a perspective view of an integrated HVAC system according to one embodiment of the invention.

FIG. 1 illustrates a first embodiment of an integrated HVAC system for use in a vehicle. The integrated HVAC unit includes an auxiliary HVAC unit and a compressor/condenser unit. The auxiliary HVAC unit may be contained within the cab and generally includes an air inlet, a brushless direct current (BLDC) blower motor, a starter module and air outlets.

In the preferred embodiment of FIG. 1, the compressor/condenser unit is configured to be mounted on the exterior of the vehicle. Condensed refrigerant is circulated from the condenser to the second evaporator of the auxiliary HVAC unit (shown in FIG. 2). Condensed refrigerant is evaporated to cool air entering the air inlet of the auxiliary HVAC unit. The evaporated refrigerant is then recirculated to the compressor/condenser unit as in a conventional refrigeration cycle.

In this preferred embodiment, a coolant heater is coupled to the compressor/condenser unit. In a preferred exemplary embodiment, the coolant heater may be a fuel fired heater (FFH) that burns fuel from the vehicle fuel supply to heat the cabin. One suitable FFH is a diesel fueled heater commercially available from ESPAR of Mississauga, Ontario. In the case of a FFH, the coolant heater may be coupled to the compressor/condenser unit on the exterior of the vehicle to allow for safe venting of exhaust gasses. Alternatively, the coolant heater may be mounted closer to or on the auxiliary HVAC unit if, for example, the coolant heater is an electric heater or other device that does not require venting of exhaust gasses.

In some embodiments, the coolant heater may be coupled to the engine cooling system such that engine coolant may be circulated through the coolant heater and the heater core in the auxiliary HVAC unit. Alternatively, the coolant heater and heater core may be isolated from the engine cooling system (i.e., in a separate closed coolant loop).

The integrated HVAC systems may be powered by a variety of power sources that are independent of the engine. For example, the auxiliary HVAC system may be powered by an auxiliary power unit (APU), vehicle batteries, batteries dedicated to the auxiliary HVAC system, or shore power (i.e., AC power). In one preferred embodiment, the compressor motor is designed as a 110 volt AC motor, while in others it is designed as a 12 volt or 24 volt DC motor. In some embodiments, a heat recovery device may be used to recover heat generated by the power unit that would otherwise be lost.

Figure 2:
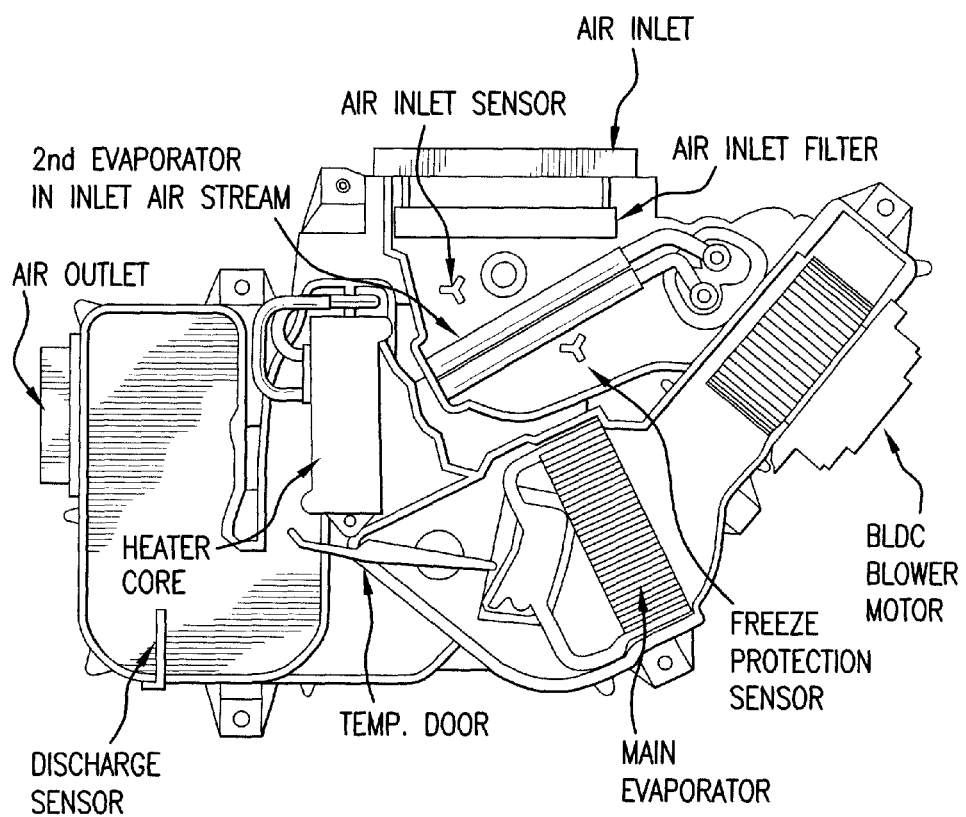
FIG. 2 is a fragmentary cross-sectional view of a portion the HVAC system of FIG. 1.
Figure 3:
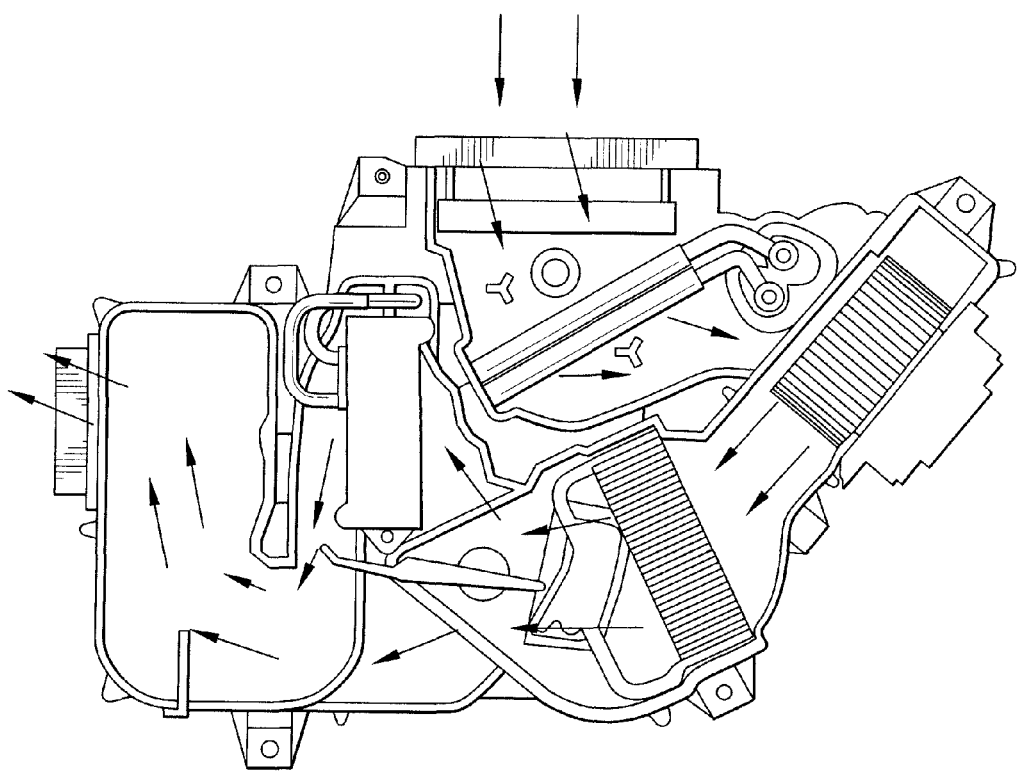
FIG. 3 is a fragmentary cross-sectional view of a portion the HVAC system of FIG. 1.

FIGS. 2 and 3 illustrate the auxiliary HVAC unit of FIG. 1 and the general flow of air through it. The auxiliary HVAC unit generally includes an air inlet, a second evaporator, a BLDC blower motor, a main evaporator, an actuator (shown as a temperature door (temp. door)), a heater core, and an air outlet. An air inlet filter may be positioned in the air inlet to remove particulates that may damage the auxiliary HVAC unit or that are not desired in the outlet air stream. An air inlet sensor may also be used to monitor the temperature of the air entering the unit, and a freeze protection sensor may be used to detect ice forming on or near the second evaporator.

As illustrated in FIG. 3, in some embodiments, air may be drawn into the air inlet by the blower motor. The inlet air may be recirculated from the cabin, or the air may be fresh air drawn from outside the vehicle. The temperature of the inlet air is measured by the air inlet sensor. This temperature measurement may be used by a controller logic that controls the coolant heater, refrigerant system, temperature door, and/or blower motor. The air passes through the second evaporator where the air may selectively or optionally be cooled. The second evaporator is coupled to the compressor/condenser unit (shown in FIG. 1) which is designed to be operated when the vehicle is parked and not idling, although it can be operated also when the vehicle engine is running, e.g., to provide additional cooling.

The air is then drawn into the blower motor where it is accelerated. Upon exiting the blower motor, the air stream passes through the main evaporator where it may be selectively or optionally cooled. The main evaporator may be coupled to the vehicles primary air cooling system (i.e., the primary compressor and condenser). The air then passes the temperature door.

The temperature door may be controlled to regulate the flow of air through the heating core. When the temperature door is moved to a position for maximum cooling, the temperature door blocks airflow to the heating core, such that the cool air that has been cooled at one or more of the evaporators bypasses the heating core. When the system is used for maximum heating, the temperature door directs substantially all of the air flow through the passage where the heating core is located. Heat is supplied to the heater core by hot circulated coolant (e.g., an ethylene glycol and water mixture) that has been heated in the coolant heater (e.g., the FFH coupled to the compressor/condenser unit) and/or in the engine.

The heated or cooled air then passes a discharge sensor that measures the temperature of the air exiting the auxiliary HVAC unit. The temperature measurement may be used by a controller logic that controls the coolant heater, refrigerant system, temperature door, and/or blower motor.

The air then exits the auxiliary HVAC unit at the air outlet. The air outlet may be coupled to an auxiliary duct system, or the vehicles primary air distribution system.

When the vehicle engine is running, the second evaporator may be used in conjunction with the main evaporator to cool the cabin air (i.e. to provide additional cooling capacity when required). In alternative embodiments, the second evaporator and the main evaporator may both be upstream of the blower motor (i.e. between the inlet and the blower motor). In yet other embodiments, both the second evaporator and the main evaporator may both be downstream of the blower motor. In even further embodiments, the second evaporator may be downstream of the blower motor while the main evaporator is upstream of the evaporator.

The auxiliary HVAC unit may be positioned in a cabin zone. For example, in a commercial truck, the auxiliary unit may be placed in a sleeper cab. In such embodiments, the optional main evaporator may be coupled to the vehicle's primary HVAC system to cool the sleeper cab while the vehicle is operating. If needed, the auxiliary HVAC unit may be used to provide (additional) cooling capacity. When the vehicle is parked and not idling (i.e., for a driver break) the main evaporator (if present) is not used, but the second evaporator is used to cool the sleeper cab. The external compressor/condenser unit is used to supply condensed refrigerant to the condenser and may be powered by an APU, vehicle batteries, batteries dedicated to the auxiliary HVAC system, and/or shore power such as a 10 volt AC power supply.

FIGS. 4 and 5 are mutually perpendicular side views illustrating details of the compressor/condenser unit shown in FIG. 1. Expanded refrigerant is circulated to the compressor where the refrigerant is pressurized. The compressed refrigerant is liquified in the condenser. The pressurized liquid refrigerant is then evaporated in the second evaporator to absorb heat from the inlet air. Because the compressor, condenser, and evaporator comprise a closed loop, these components may be pre-charged with refrigerant prior to installation in a vehicle.

The auxiliary HVAC unit preferably includes a control interface for a user to select the temperature and/or blower speed. In some embodiments, the same controller interface may be used to regulate both the main evaporator when the vehicle is operating and the second evaporator when the vehicle is parked and not idling, or while the vehicle engine is running. In a preferred embodiment, the vehicle operator is provided with a single control panel to control the cabin comfort irrespective of whether either or both of the first and second refrigeration systems (i.e., main and second evaporators) is/are operating. For example, the single control panel may have only two control settings, one for temperature and another for fan speed.

The heater core of the auxiliary HVAC unit receives circulated, heated coolant from the coolant heater. In some embodiments the coolant heater is a FFH. The FFH may be operated using the vehicles fuel (i.e. gasoline or diesel). An exhaust port vents the FFH exhaust to the exterior of the cabin.

Figure 9:
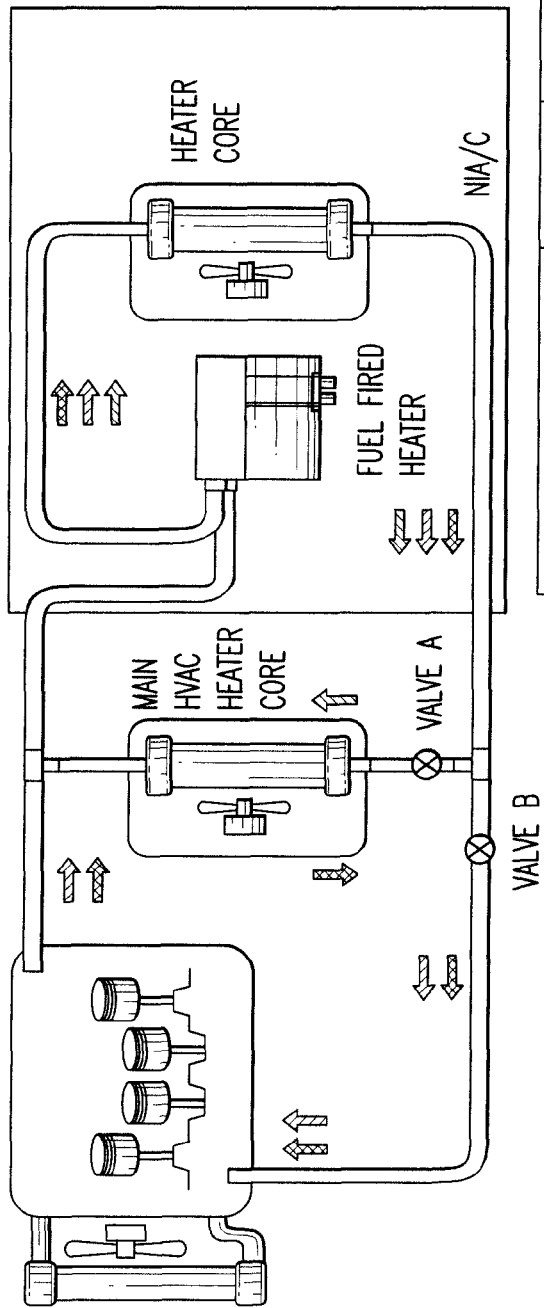
FIG. 9 is a schematic view of a coolant loop according to one embodiment of the invention.

FIG. 9 illustrates a coolant loop layout that may be employed with the auxiliary HVAC system. In some embodiments, a main HVAC heater core receives hot coolant from the vehicle engine when the vehicle is running. The engine coolant is also circulated to the coolant heater (shown as a fuel fired heater) which is in series with the heater core of the auxiliary HVAC unit. The heater core and coolant heater are in parallel with the main HVAC heater core. When the vehicle is parked and not idling, coolant may be heated in the coolant heater and circulated to the heater core to warm the air in a cabin zone (e.g., the sleeper cab). The coolant can also be circulated to the main HVAC heater core such that other areas of the cabin may be heated. Valve B is closed to prevent circulation of the coolant to the engine where heat would be lost.

When the engine is running, valve B and valve A may be opened to utilize heat generated by the engine for heating the cabin. Valve A may also be closed such that hot coolant is circulated to the engine to warm the engine up prior to or just after starting. The controller of the auxiliary HVAC system may be configured to control valves A and B. Further details of the first type of HVAC system are found in U.S. Provisional Application No. 60/827,620, filed Sep. 29, 2006, the entire contents of which are hereby incorporated by reference.

Figure 6:
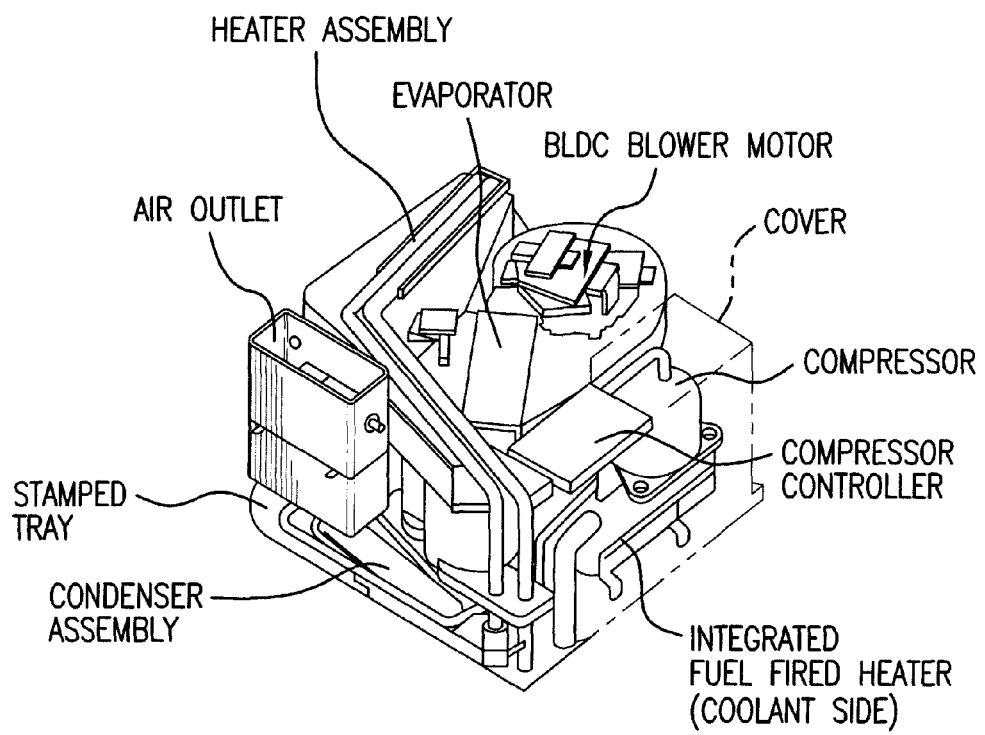
FIG. 6 is a perspective view of an alternative auxiliary HVAC system according to one embodiment of the invention.

FIG. 6 illustrates an alternative integrated HVAC system for use in a vehicle. The system generally includes a brushless direct current (BLDC) blower motor, and evaporator in fluid communication with a compressor and a condenser to form a refrigeration loop, a coolant heater (shown as a fuel fired heater (FFH)), and an air outlet. A stamped tray is provided to separate the condenser and coolant heater from the other components of the system.

In an exemplary embodiment, the coolant heater may be a fuel fired heater (FFH) that burns fuel from the vehicle fuel supply to heat the cabin. One suitable FFH is a diesel fueled heater commercially available from ESPAR of Mississauga, Ontario. In the case of a FFH, the coolant heater may be coupled to the integrated auxiliary HVAC unit on the exterior of the vehicle, under the cab floor, to allow for safe venting of exhaust gasses.

A compressor controller may be provided to regulate the compressor. This may conserve energy consumed by the compressor and regulate the temperature of the vehicle cabin. In an exemplary embodiment, the auxiliary HVAC system may be controlled by a vehicle occupant by the same control interface as the main HVAC system of the vehicle.

Figure 8:
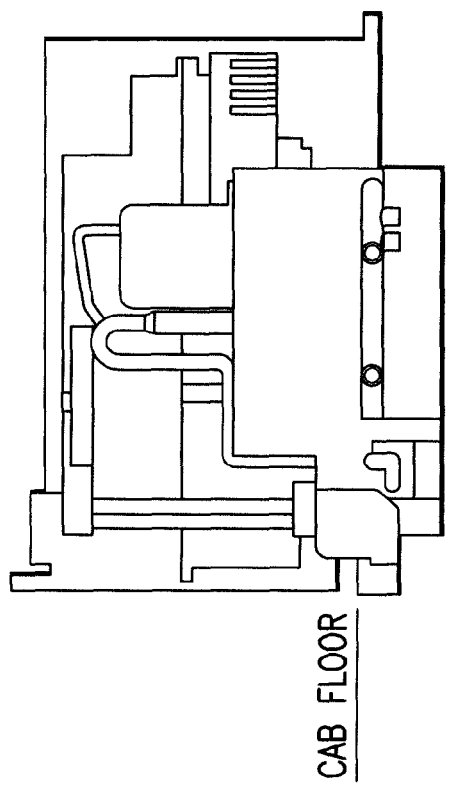
FIG. 8 is a front elevation view of the HVAC system of FIG. 6.
Figure 7:
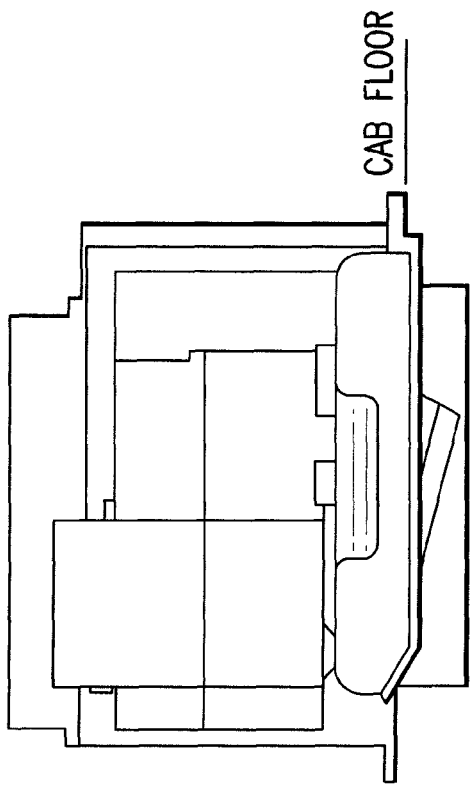
FIG. 7 is a side elevation view of the HVAC system of FIG. 6.

As shown in FIGS. 7 and 8, the system may be installed such that a lip of the stamped tray is flush with the cab floor. This configuration places the condenser and coolant heater outside of the vehicle cabin, allowing for heat loss from the condenser and safe exhaust venting from the coolant heater. Accordingly, the system may be installed in a cab floor without being plumbed with the vehicle's primary refrigeration and heating loops. In some embodiments, the system may be coupled to a floor panel of a vehicle such that an OEM can install the system simply by installing the floor panel during vehicle assembly.

Because the integrated HVAC system includes its own evaporator, condenser and compressor, the system may be pre-charged with refrigerant. This simplifies installation in the vehicle by avoiding charging of the system after being connected with the vehicle's primary refrigerant loop. Further details of this second type of system can be found in U.S. Provisional Application No. 60/827,639, filed Sep. 29, 2006, the entire contents of which are hereby incorporated by reference.

Figure 10:
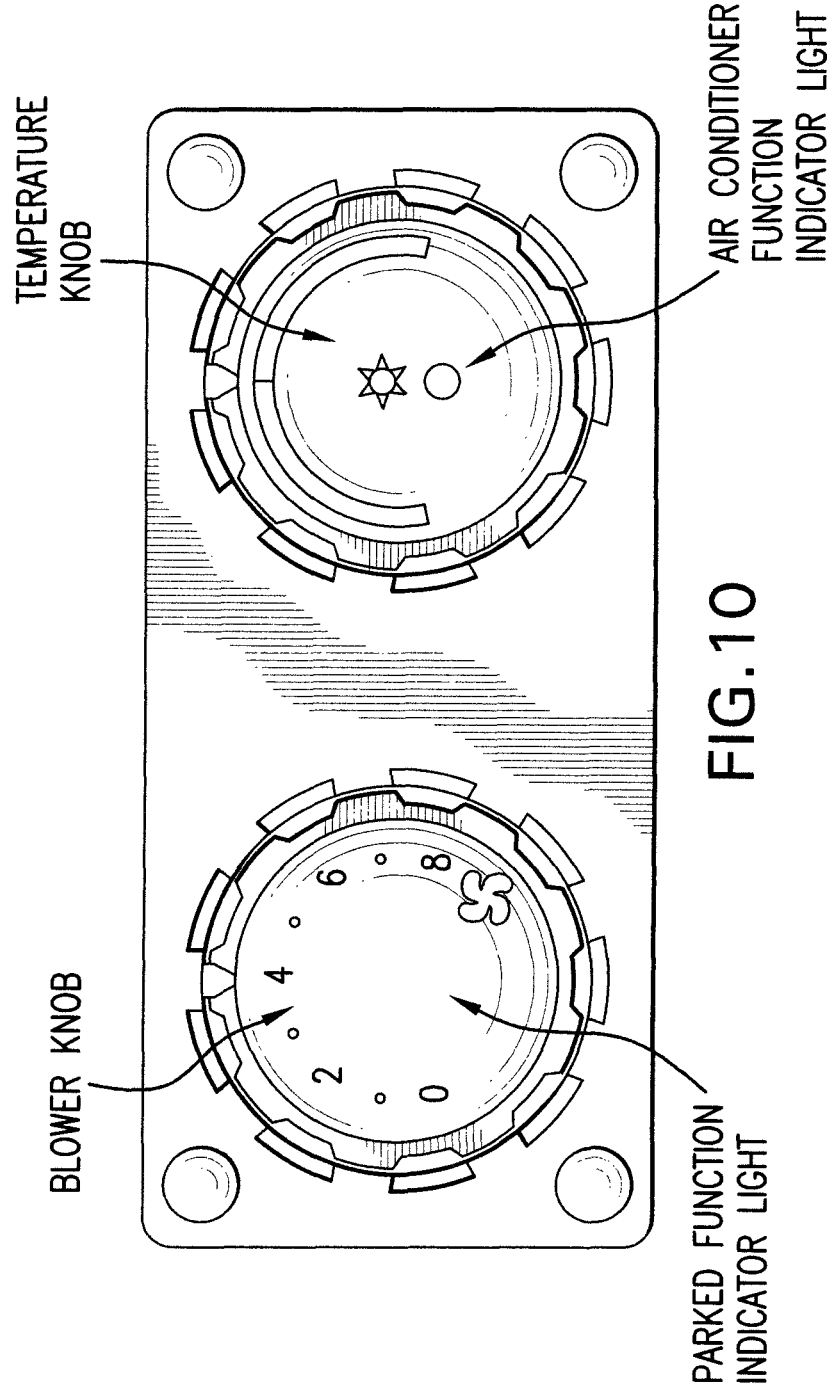
FIG. 10 is an elevation view of a control panel according to one embodiment of the invention.

FIG. 10 illustrates an exemplary control panel for use in controlling the auxiliary HVAC system. It is advantageously located in or near the sleeper cab in an over-the-road truck. The controller provides a user interface including a temperature knob and a blower knob. In the embodiment shown, the temperature knob and the blower knob are simultaneously also push button knobs. The knobs may be turned to select blower speed and temperature. Also, the blower knob may be pressed to activate the parked function. When the parked function is activated, the auxiliary HVAC system may be independently used to heat and/or cool the passenger cab of the vehicle. When the park function is activated, the Parked Function Indicator Light is turned on. The Parked Function Indicator Light is preferably an amber LED, but may be any suitable indication device. The temperature knob may be pressed to select the AC mode. When the AC and parked function are activated, the condenser and compressor of the auxiliary HVAC system may be used alone to cool the passenger cab. When the AC is deactivated, the control system may recycle fresh air from the main HVAC system air intake to cool the cabin. When the vehicle is not parked, the temperature knob may be pressed to activate the vehicle's primary AC system.

Either the HVAC system of FIGS. 1-5 or that of FIGS. 6-8 may be controlled according to the principles explained above. Other different auxiliary HVAC systems may alternatively be used. The controller may be configured such that the fresh air intake of the vehicles primary HVAC system may be controlled when the auxiliary system is in use. When the parked function is activated, the blower speed of the auxiliary HVAC system may be varied independently of the blower knob setting. This allows the controller system to select one or more operating parameters that maintain a comfortable passenger cab, while regulating power consumption with a parked vehicle.

In some embodiments, the control system may include diagnostic functions to control and monitor system performance. Malfunctions may be detected by comparing measured sensor readings (e.g., temperature measurements at the inlet, evaporator, heating core, air outlet or other point in the system, or pressure measurement for the refrigerant and/or coolant loops) and comparing the measured values to expected values.

The controller may be coupled to the primary HVAC system in such a way that the recirculation door of the primary HVAC system can be actuated when the vehicle is parked. In some embodiments, the blower motor of the primary HVAC system may be controlled by the auxiliary controller when the vehicle is parked.

In some embodiments, the controller may detect if the vehicle is parked, independently of an input from the vehicle occupant. For example, the controller may be configured to detect parking brake engagement, ignition voltage, engine status (e.g., RPM) or other parameters that may indicate if the vehicle has been parked.

In some embodiments, the controller may be mounted in a sleeping compartment of a vehicle. In other embodiments, the controller may be mounted in the driver compartment.

FIGS. 11-19 are flow diagrams for an exemplary controller. The controller may be based solely or primarily upon maintaining comfort, or according to any other desired control philosophy, e.g., energy management. Ambient temperatures, system voltages, evaporator temperature and/or outlet temperature may be monitored and used to control air conditioning and heating functions. The energy used by the system can optionally also be considered for carrying out a program that provides maximum battery operation and/or life of heating/coolant components. Typically, certain predetermined comfort conditions are specified under a set of standard environmental parameters, and any control paradigm that is capable of accomplishing the predetermined test standard will be satisfactory. Thus, the fundamental criterion is passenger comfort.

The controller may be operated by a user interface (such as the controller of FIG. 10) for temperature and blower control and also for switch inputs for turning on and off the parking heat and cool functions. In some embodiments, the controller has the ability to start an auxiliary power unit as well as communicate with the primary HVAC controller, e.g., to incorporate fresh air into the cabin by operating the fresh air (recirculation) door if needed. The system may be designed to automatically adjust the heating and cooling performance by inputs from the cabin to maintain the desired comfort level.

In some embodiments, the controller may be designed to go into a "sleep" state when the vehicle is running. In these embodiments, the controller can be set to perform one or more parked functions during normal vehicle operating conditions, or these functions can be requested from the vehicle off state. This will wakeup the controller from its sleep state and set the appropriate outputs for the requested action when the vehicle is parked.

In some embodiments, the user is allowed to set the desired comfort temperature from the rear (or auxiliary) control panel. The user interface can be controlled when the engine is off or on. This is done by turning up or down the knobs on the user interface.

The controller may automatically increase the blower to a preselected minimum speed setting if the evaporator temperatures are approaching a predetermined set point, to reduce evaporator freezing. Also, the blower output may be reduced from those levels at which the blower would operate while the vehicle is running, to maintain comfort and energy efficiency.

The controller may be used to control the valve system of the coolant loop to optimize heating performance during usage. (See FIG. 9). The system controller may optimize the coolant flow to the engine during engine warm-up (when the engine is subject to cold start), and then change the flow path while the vehicle is running.

The controller may optimize comfort by turning on and off the compressor and condenser fan based on the temperature set point, refrigerant pressures, and ambient, inlet and outlet temperatures. A solenoid valve may be used on the refrigerant plumbing tied to the compressor on/off signal to keep oil from acuminating in the compressor. The solenoid valve may be used to regulate the flow rate of refrigerant to optimize cabin conditions and minimized energy consumption. A timer may also used to control the number of on/off cycles the compressor may repeat within a specified period of time to increase the reliability of the compressor.

In some embodiments, the controller checks if 120 volt AC (i.e. shore power) is available before turning on the parked functions, e.g., by looking at a signal wire. If shore power is not available, the controller may activate an APU. If no signal is available and the APU does not turn on, the system goes back to sleep. If there is a loss of shore power after activation of the parked functions, the system goes back to sleep mode.

The system may also determine if park functions are needed by checking brake line status, ignition voltage and the engine RPM signal via serial communication. The controller may be coupled directly to sensors that monitor one or more of these parameters, or the controller may communicate with a vehicle computer to obtain the data.

In some embodiments, the control system may also include diagnostics. In these embodiments, the controller may have the ability to store and transmit diagnostic messages (e.g., via j1939 bus). Messages may be stored in memory until the vehicle bus is online. For example, compressor and air conditioning diagnostics may include measuring the air out temperature and comparing the measured value to an expected value. If the measured value and expected value are different by more than a specified tolerance, the compressor may be malfunctioning. Also the controller may measure the voltage from the pressure switch to determine the proper function of the system.

Figure 11:
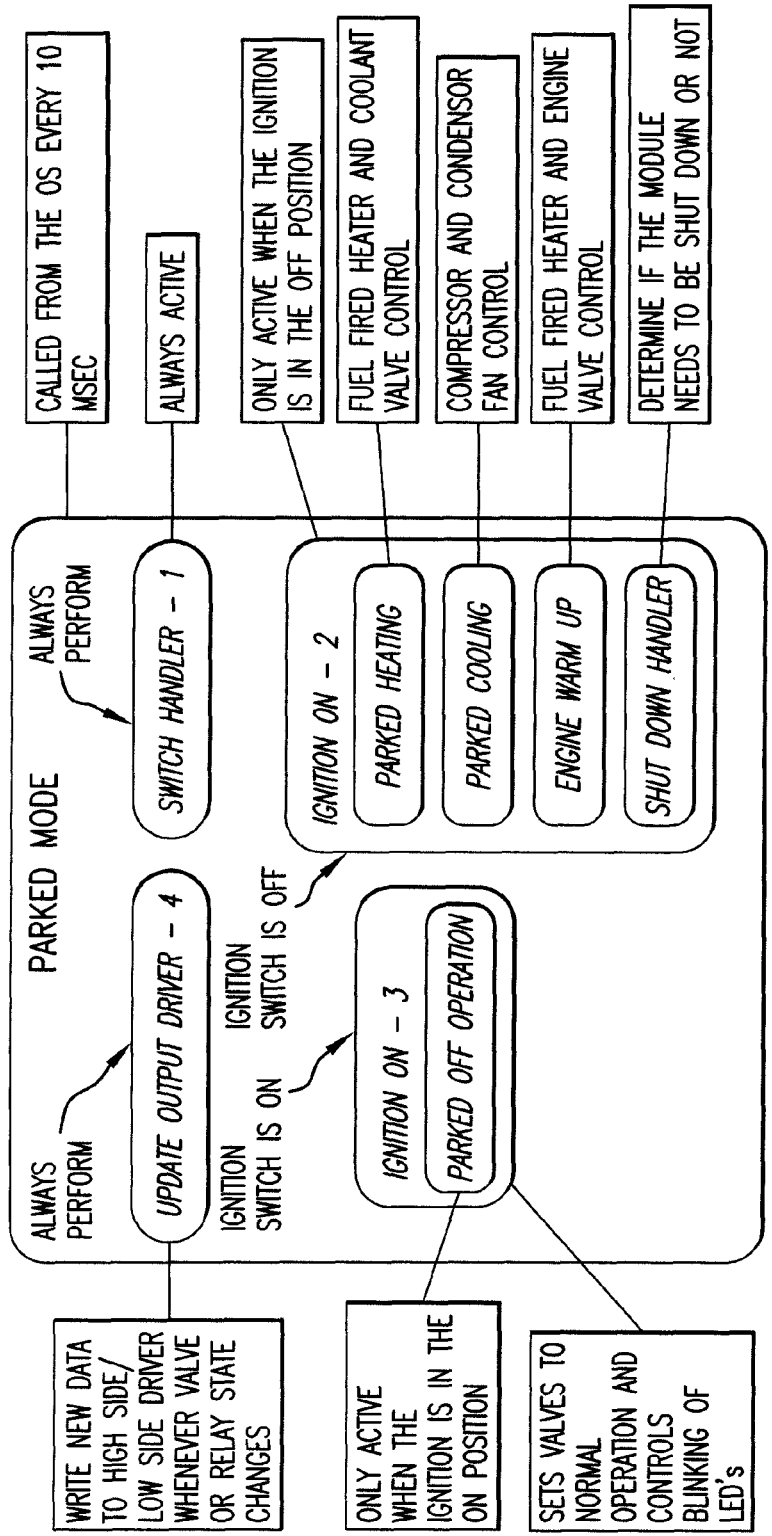
FIG. 11 is a block diagram for an HVAC control system according to one embodiment of the invention.

FIG. 11 illustrates controller states for the parked mode operation. The operation is called from the controller OS. The switch handler may determine if the ignition is on or off. Alternatively, another part of the controller logic determines the ignition status and communicates it to the operation. If the ignition is on, then the state for the parked operation is OFF and valves and controls are set to normal (i.e. running) operation. If the ignition is off, then the system operates in the parked heating, parked cooling, engine warm up, and/or shut down state.

FIG. 12 is a state diagram for the switch/button handler of FIG. 11. The state of the handler is determined by a combination of inputs including the ignition status and various parked operation requests. If the ignition is on, the parked vehicle requests (i.e., heating, cooling and engine warm up) are cleared, and the parking operations are off. If all parked operation requests are off (i.e., the controls shown in FIG. 10 are off), and the ignition is off, all parking operations are off. If the ignition is off, and at least one parking operation request is on, the appropriate LED indicator on the control panel is illuminated, and the power mode is set to the parked operation for energy efficiency.

When the system is on, one or more of the three parking operations may be activated. If the parked heating operation is requested, the switch handler sets the power mode to parked operation, clears the cooling request, sets the heating request to the desired level, clears any previous heating request, and activates the appropriate LED indicator on the controller. When the parked cooling request is made, the switch handler sets the power mode, clears the heating request, sets the cooling level, clears any previous cooling request, and activates the appropriate LED indicator. When the switch handler detects an engine warm up request, the warm up request is set, any previous warm up request is cleared, and the appropriated LED indicator is activated.

Figure 13:
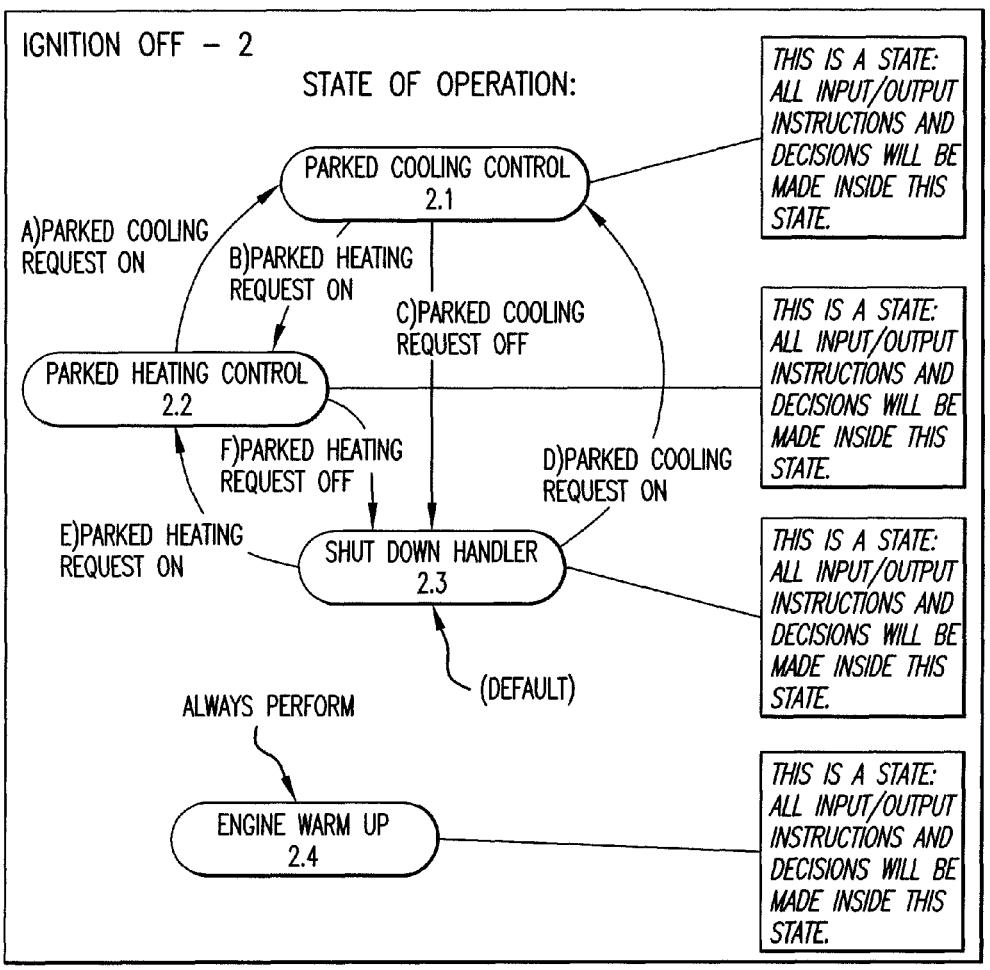
FIG. 13 is a block diagram for an HVAC control system according to one embodiment of the invention.

FIG. 13 is a state diagram for the HVAC control system when the engine ignition is off. FIG. 13 illustrates the transitions among the states and the controlling inputs for state changes. The system changes between the parked cooling and parked heating states based upon the most recent heating or cooling request. Also, when either the cooling or heating request is OFF, the shut down handler is called. The engine warm up state is operated independently of the other states.

Figure 14:
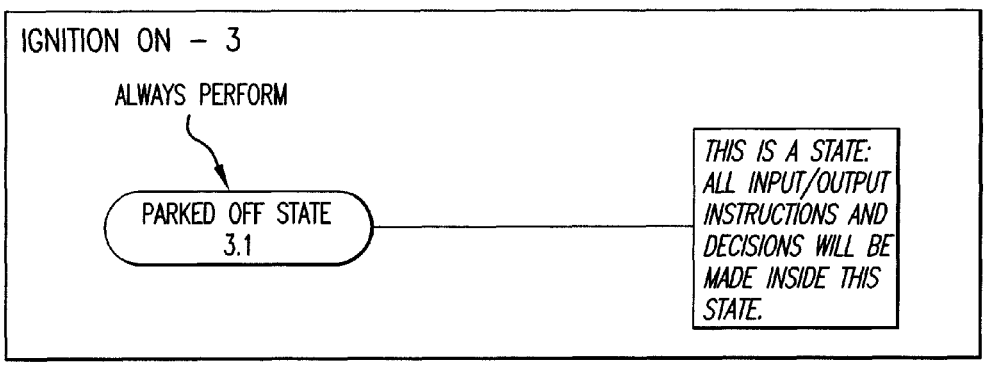
FIG. 14 is a block diagram for an HVAC control system according to one embodiment of the invention.

FIG. 14 is a state diagram for the system when the ignition is on. Any time the ignition is on, the controller operates in the parked OFF state. Alternatively, the system could operate when the ignition is on. In other embodiments, the system could operate with limited functionality when the ignition is on.

Figure 15:
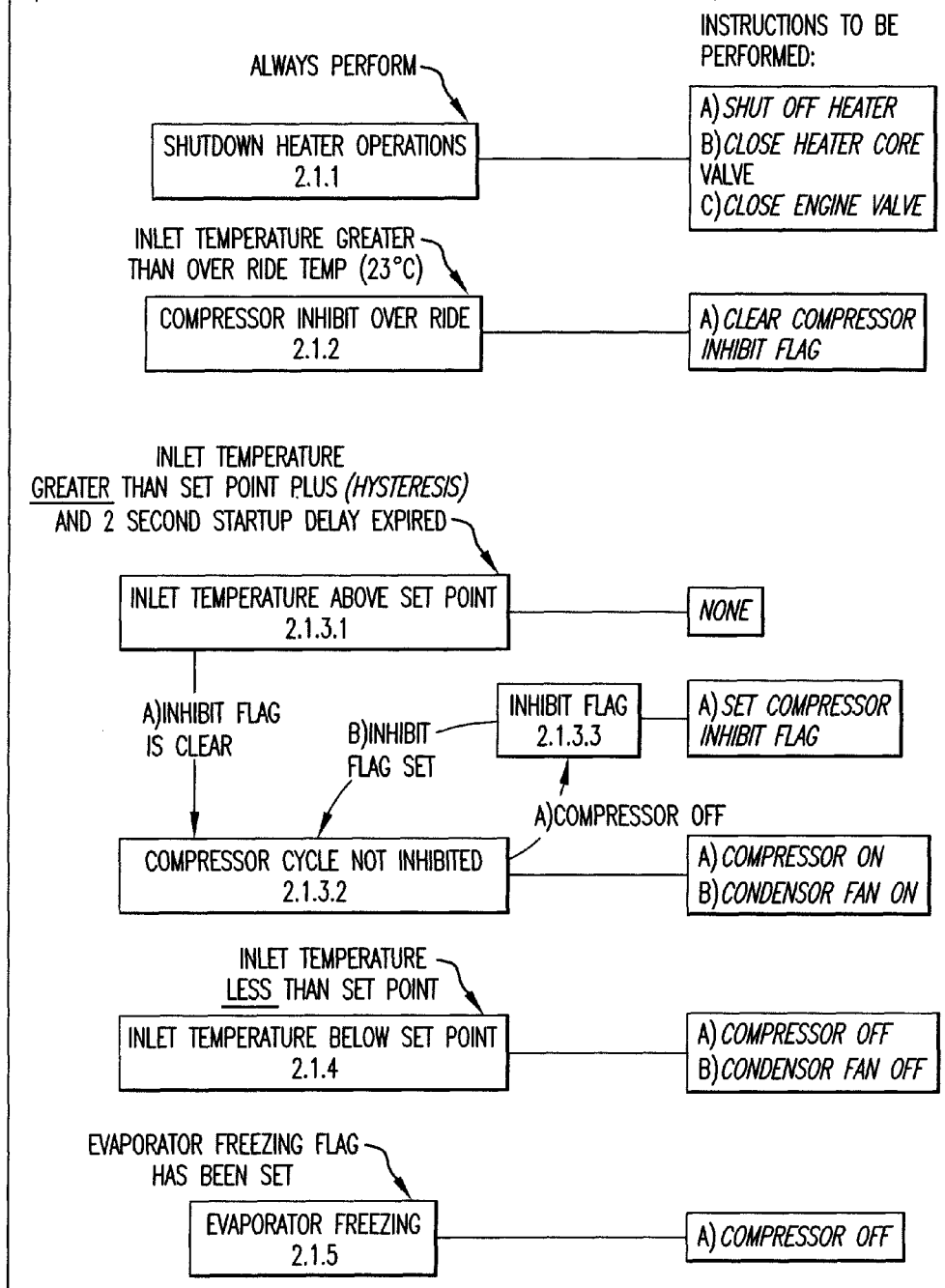
FIG. 15 is a block diagram for an HVAC control system according to one embodiment of the invention.

FIG. 15 is a state diagram for the parked cooling operation. Anytime the parked cooling operation is ON, the heater shutdown state operation is carried out. The heater is shut off and the heater core and engine valves are closed to prevent coolant circulation. The compressor inhibit over ride operation is called and if the inlet air temperature is over a preset level (e.g. 23° C.), the compressor inhibit flag is cleared, and the compressor may be operated. The compressor inhibit flag is set based on the override temperature such that the compressor does not run if the inlet air temperature is above the override set point. This prevents wasting energy by needlessly operating the compressor. The preset override temperature may be set to any desired temperature.

A second startup delay may be used to limit start and stop cycles that increase wear on compressor components. The delay may be set as a minimum amount of time between shut down and start up. Alternatively, the delay may be based on a maximum number of cycles allowed during a given time period. When the inlet temperature is greater than the cabin set point temperature and the second startup delay has expired, the compressor inhibit flag is cleared, and the compressor may be operated to cool the cabin. When the cabin temperature reaches a desired level, the compressor is shut off.

When the inlet temperature is below the cabin set point, the compressor may be inhibited so that the air conditioning loop is not operated. This prevents wasting energy by needlessly running the compressor and the condenser fan. The compressor may also be inhibited by the control system if the system detects that the evaporator is freezing.

Figure 16:
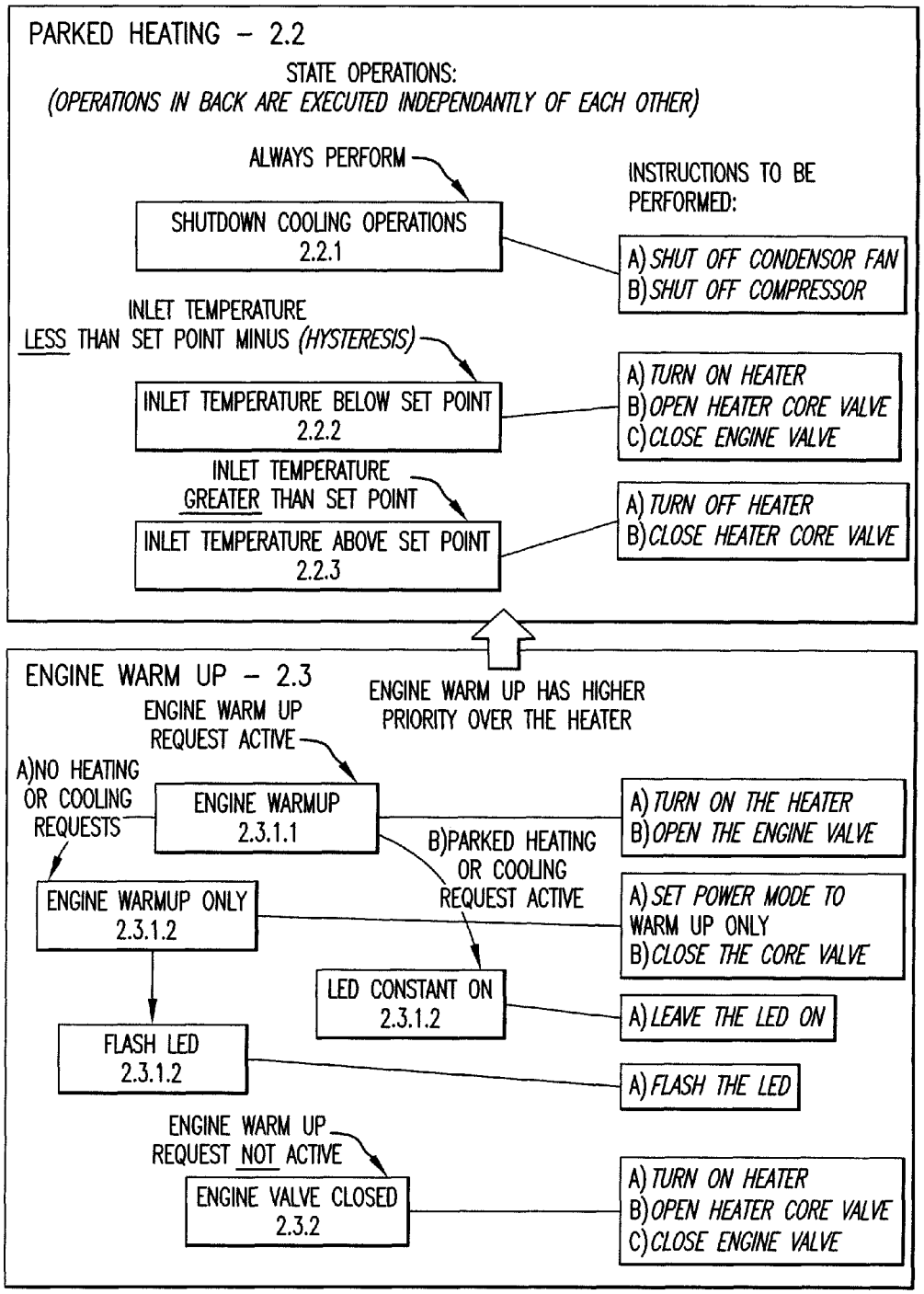
FIG. 16 is a block diagram for an HVAC control system according to one embodiment of the invention.

FIG. 16 is a state diagram for the parked heating and engine warm up operations. In the event of a conflict between the operations (i.e., both operations are being carried out simultaneously and one is preventing the operation of the other) then the engine warm up operation is favored by the controller logic.

The parked heating operation is selected by the switch handler. When the parked heating operation is ON, the cooling operations are shutdown. The inlet temperature is compared to the cabin set point. If the inlet temperature is below the set point, the heater is turned on, the heater core valve is opened and the engine valve is closed. If the inlet temperature is above the set point, the heater is turned off and the heater core valve is closed.

It should be noted that temperatures above and below the set points may be in relation to more than one set point. For example, the controller may activate the heater when the cabin temperature is below the set point (e.g., a point below the selected cabin temperature) and the heater may be shut off when the cabin temperature exceeds the selected cabin temperature by a certain amount. In some such embodiments, the heater may be activated if the cabin temperature falls more than about 1 to 2 degrees below the selected cabin temperature, and the heater may be turned off if the cabin temperature exceeds the selected cabin temperature by more than about 1 to 2 degrees. The controller may be a proportional, integral, derivative (PID) controller or any other suitable controller. This is equally true when controlling the cooling functions.

The engine warm up operation is called when the engine warm up request is active. The heater is turned on, and the engine valve is opened. If there are no heating or cooling requests, then the system is operated in the engine warm up only mode, the power mode is set accordingly, and the heater core valve is closed. The engine warm up LED indicator may advantageously be set to flash in this situation.

If, in addition to the engine warm up request being active, a heating or cooling request is active, the engine warm up LED indicator may be on. In this situation, the engine warm up mode is favored, and the parked heating or cooling request is not carried out. Alternatively, a heating request may be carried our simultaneously with the engine warm up operation, while favoring engine warm up. When the engine warm up request is not active, the engine valve is closed.

Figure 17:
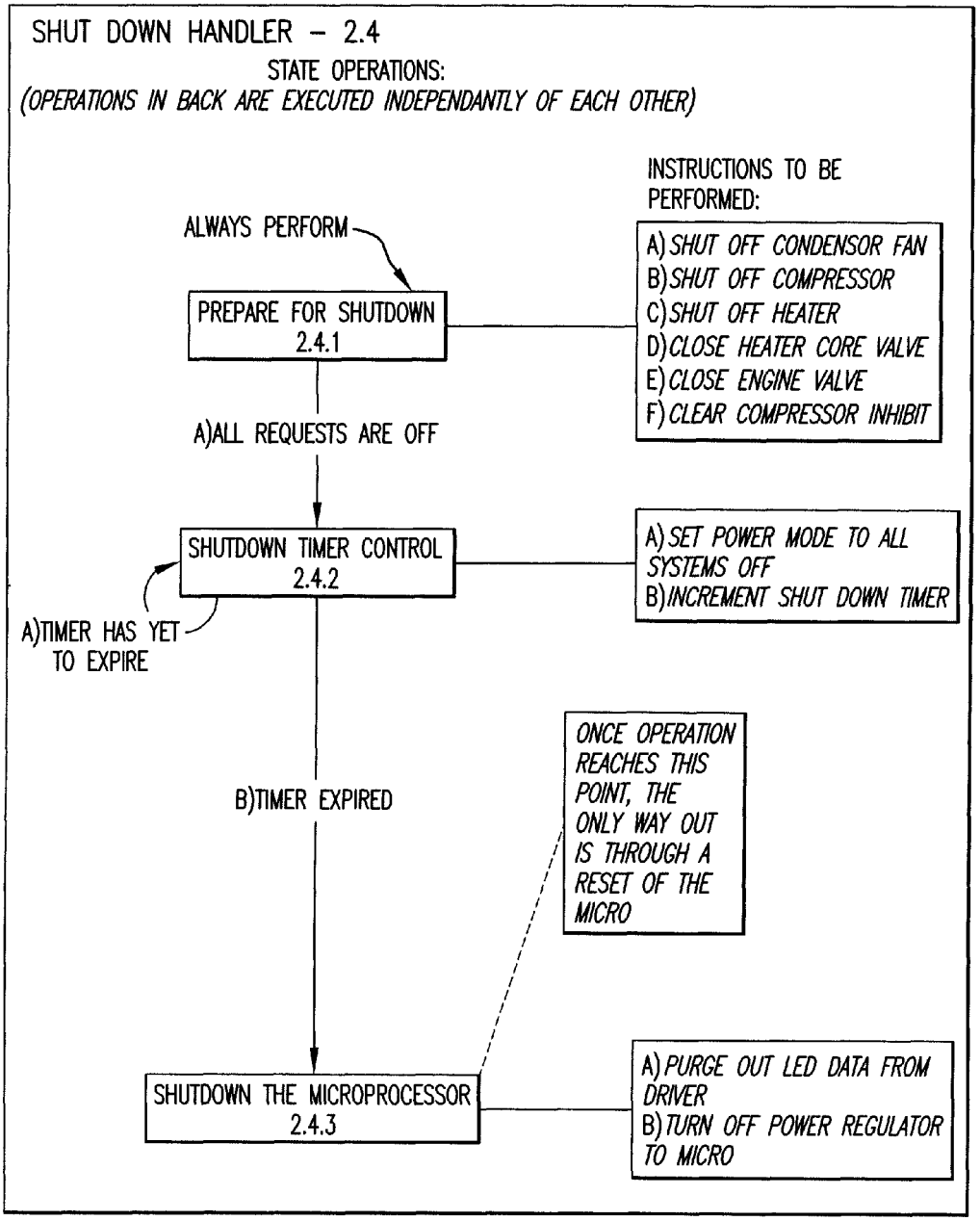
FIG. 17 is a block diagram for an HVAC control system according to one embodiment of the invention.

FIG. 17 is a state diagram for the shut down handler. The handler shuts down the auxiliary HVAC system components and may be operated on a timer.

Figure 18:
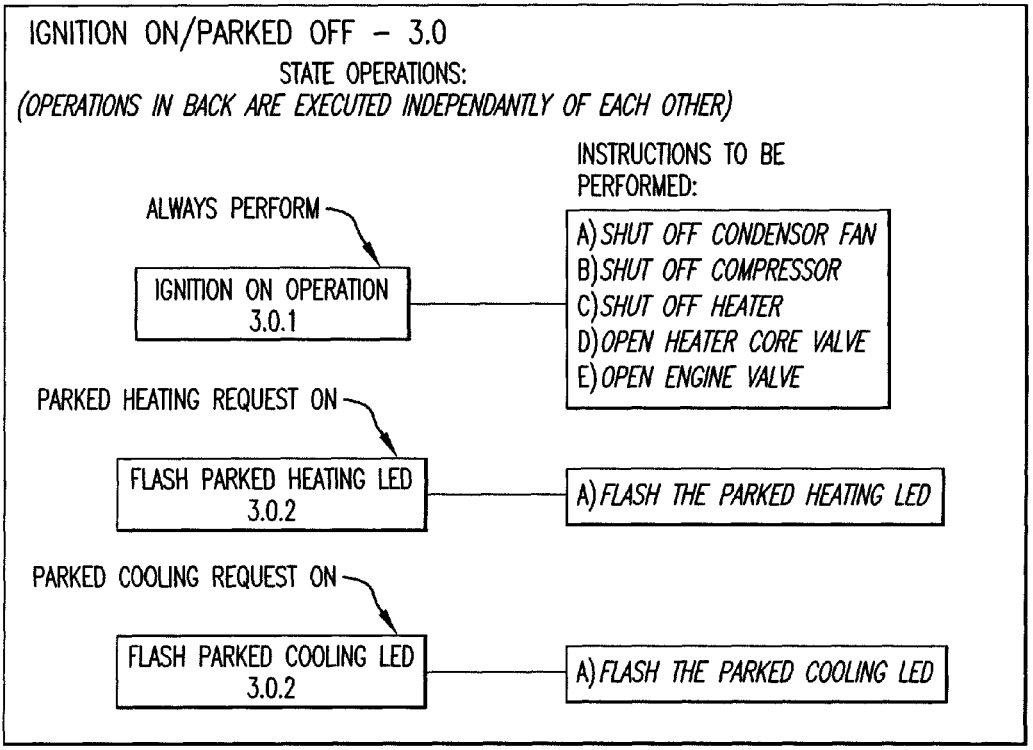
FIG. 18 is a block diagram for an HVAC control system according to one embodiment of the invention.

FIG. 18 is a state diagram for the system when the ignition is on. When the ignition is on, the auxiliary HVAC system components (e.g., compressor, condenser fan, and heater) are shut off, and the coolant valves are opened. If there is an active parked heating or cooling request (i.e., the vehicle occupant has set the controller interface to heat or cool), the corresponding LED indicator may be flashed to indicate to the occupant that the request is not being carried out.

Figure 19:
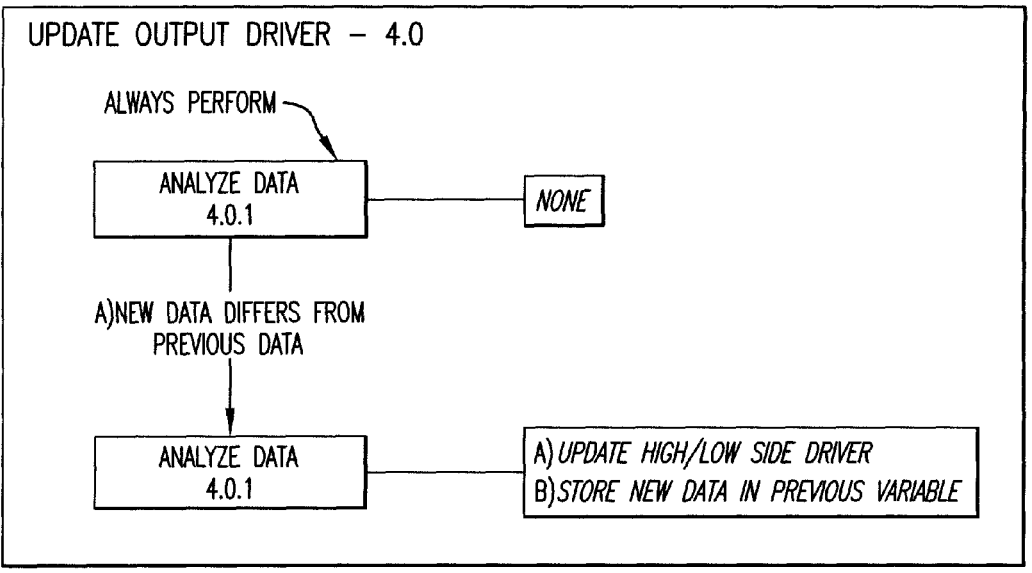
FIG. 19 is a block diagram for an HVAC control system according to one embodiment of the invention.

FIG. 19 is a state diagram for updating the output driver. The output driver analyzes data collected and updates the values for use by the controller logic.

FIG. 20 illustrates various elements of an embodiment of the present invention. The embodiment includes an auxiliary climate control system for a vehicle having a primary climate control system which primary climate control system has a primary compressor, a primary condenser, a primary controller and a primary blower motor controlled by the primary controller. The auxiliary climate control system includes an auxiliary compressor, an auxiliary condenser in fluid communication with the auxiliary compressor, an auxiliary evaporator in fluid communication with the auxiliary compressor and the auxiliary condenser, an auxiliary blower motor, and an auxiliary controller configured to control the auxiliary climate control system. The auxiliary controller is configured to determine whether a vehicle is parked and to control the primary blower motor or a fresh air door of the primary climate control system when the vehicle is parked, and the auxiliary climate control system is adapted to heat and cool the vehicle independently of the primary climate control system of the vehicle.

Although the foregoing has been described with reference to exemplary embodiments, workers skilled in the art will recognize that changes may be made in form and detail without departing from the spirit and scope thereof. For example, although different example embodiments may have been described as including one or more features providing one or more benefits, it is contemplated that the described features may be interchanged with one another or alternatively be combined with one another in the described example embodiments or in other alternative embodiments. The present subject matter described with reference to the example embodiments and set forth in the following claims is manifestly intended to be as broad as possible. For example, unless specifically otherwise noted, the claims reciting a single particular element also encompass a plurality of such particular elements. Many other changes and modifications may be made to the present invention without departing from the spirit thereof. The scope of these and other changes will become apparent from the appended claims. The steps of the methods described herein may be varied, and carried out in different sequences.

What is claimed is:

1. An auxiliary climate control system for a vehicle having a primary climate control system with a primary compressor, a primary condenser, a primary controller and a primary blower motor controlled by the primary controller, the auxiliary climate control system, comprising:
an auxiliary compressor;
an auxiliary condenser in fluid communication with the auxiliary compressor;
an auxiliary evaporator in fluid communication with the auxiliary compressor and the auxiliary condenser;
an auxiliary blower motor;
an auxiliary controller configured to control the auxiliary climate control system; and
wherein the auxiliary controller is configured to determine whether a vehicle is parked and to control the primary blower motor or a fresh air door of the primary climate control system when the vehicle is parked; and
wherein the auxiliary climate control system is adapted to heat and cool the vehicle independently of the primary climate control system of the vehicle.

2. The auxiliary climate control system of claim 1, wherein the auxiliary controller is adapted to measure an outlet air temperature.

3. The auxiliary climate control system of claim 1, wherein the auxiliary controller is adapted to measure a refrigerant temperature.

4. The auxiliary climate control system of claim 1, wherein the auxiliary controller is adapted to measure a refrigerant pressure.

5. An auxiliary climate control system for a vehicle having a coolant-cooled engine and a primary climate control system with a primary compressor, a primary condenser, a primary controller and a primary blower motor controlled by the primary controller, the auxiliary climate control system comprising:
an auxiliary compressor;
an auxiliary condenser in fluid communication with the auxiliary compressor;
an auxiliary blower motor;
an auxiliary evaporator in fluid communication with the auxiliary compressor and the auxiliary condenser;
an auxiliary controller configured to regulate the operation of the auxiliary climate control system; and
a sensor in communication with the auxiliary controller;
wherein the sensor is configured to detect an operating parameter that indicates if the vehicle is running, and
wherein the auxiliary climate control system is adapted to heat and cool the vehicle independently of the primary climate control system of the vehicle and to control the primary blower motor or a fresh air door of the primary climate control system when the operating parameter is not detected.

6. The auxiliary climate control system of claim 5, wherein the operating parameter is a brake line status, an engine cycle rate, or an ignition voltage.

7. An auxiliary climate control system for a vehicle having a primary climate control system, the primary climate control system including a primary controller, a primary compressor, a primary condenser, and a primary blower motor and being adapted to heat and cool the vehicle, the auxiliary climate control system comprising:
an auxiliary compressor, an auxiliary condenser in fluid communication with the auxiliary compressor, and an auxiliary evaporator in fluid communication with the auxiliary compressor and the auxiliary condenser; and
an auxiliary controller configured to regulate the auxiliary climate control system and to communicate with the primary controller,
wherein the auxiliary climate control system is adapted to heat and cool the vehicle independently of the primary climate control system; and
a sensor for detecting whether the vehicle is running.

8. An auxiliary climate control system for a vehicle having a primary climate control system, the primary climate control system including a primary controller, a primary compressor, a primary condenser, and a primary blower motor and being adapted to heat and cool the vehicle, the auxiliary climate control system comprising:
an auxiliary compressor, an auxiliary condenser in fluid communication with the auxiliary compressor, and an auxiliary evaporator in fluid communication with the auxiliary compressor and the auxiliary condenser; and
an auxiliary controller configured to regulate the auxiliary climate control system and to communicate with the primary controller,
wherein the auxiliary climate control system is adapted to heat and cool the vehicle independently of the primary climate control system; and
a sensor for measuring an operating parameter indicative of whether the vehicle is running.

9. The auxiliary climate control system of claim 8 wherein the operating parameter is a brake line status, an engine cycle rate, or an ignition voltage.

* * * * *

UNITED STATES PATENT AND TRADEMARK OFFICE
CERTIFICATE OF CORRECTION

| | | |
|---|---|---|
| PATENT NO. | : 9,493,054 B2 | Page 1 of 1 |
| APPLICATION NO. | : 11/945715 | |
| DATED | : November 15, 2016 | |
| INVENTOR(S) | : Lewis et al. | |

It is certified that error appears in the above-identified patent and that said Letters Patent is hereby corrected as shown below:

On the Title Page

(73) Assignee shows: MAHLE International GmbH, Stuttgart (DE)

Should show:
(73) Assignees: MAHLE International GmbH, Stuttgart (DE)
                    Behr-Hella Thermocontrol GmbH, Lippstadt (DE)

Signed and Sealed this
Fifteenth Day of August, 2017

Joseph Matal
*Performing the Functions and Duties of the*
*Under Secretary of Commerce for Intellectual Property and*
*Director of the United States Patent and Trademark Office*